United States Patent
Tsui et al.

[11] Patent Number: 5,963,164
[45] Date of Patent: *Oct. 5, 1999

[54] MONOBIT KERNEL FUNCTION ELECTRONIC WAREFARE RECEIVER FOR CHARACTERIZING TWO INPUT SIGNALS

[75] Inventors: James B.Y. Tsui, Dayton; David H. Kaneshiro, Kettering; John J. Schamus, Englewood, all of Ohio

[73] Assignee: The United States of America as represented by the Secretary of the Air Force, Washington, D.C.

[*] Notice: This patent is subject to a terminal disclaimer.

[21] Appl. No.: 08/914,347

[22] Filed: Aug. 15, 1997

[51] Int. Cl.$^6$ ............................................. G01S 7/36
[52] U.S. Cl. ................................. 342/196; 342/13
[58] Field of Search ................................. 342/196, 195, 342/13

[56] References Cited

U.S. PATENT DOCUMENTS

| | | | |
|---|---|---|---|
| 4,084,251 | 4/1978 | Gillis, Jr. | 364/726 |
| 4,970,674 | 11/1990 | White | 364/726 |
| 5,059,968 | 10/1991 | Thompson et al. | 342/152 |
| 5,303,172 | 4/1994 | Magar et al. | 364/726 |
| 5,305,007 | 4/1994 | Orr et al. | 342/20 |
| 5,793,323 | 8/1998 | Tsui | 342/196 |

*Primary Examiner*—Ian J. Lobo
*Attorney, Agent, or Firm*—Gina S. Tollefson; Gerald B. Hollins; Thomas L. Kundert

[57] ABSTRACT

A broadband gigahertz frequency range radio receiver useful in electronic warfare and other applications for incoming signal detection and identification purposes. The receiver is based on Fourier transform examination of incoming signal characteristics and provides real time accomplishment of these tasks by way of using a simplified one-bit digital representation of the incoming signals and a resulting reduction of the computational load associated with the Fourier transform operation. The receiver precedes the Fourier transform operation with signal processing which may include, for example, a limiting amplifier and two bandpass filters. Two incoming signal accommodation is provided, a characteristic which is particularly improved over the characteristics of popular presently used receivers in this field.

10 Claims, 11 Drawing Sheets

MONOBIT KERNEL FUNCTION ELECTRONIC WAREFARE RECEIVER FOR CHARACTERIZING TWO INPUT SIGNALS

RIGHTS OF THE GOVERNMENT

The invention described herein may be manufactured and used by or for the Government of the United States for all governmental purposes without the payment of any royalty.

BACKGROUND OF THE INVENTION

This invention concerns the field of wide spectrum radio frequency signal receivers having signal frequency identifying capability and possible electronic warfare usage.

In the field of electronic warfare a broadband radio receiver such as the "Instantaneous Frequency Measurement" (IFM) receiver is often used as a defensive tool to sense the illumination of a target by an incoming radio frequency signal such as a radar signal. This same receiver is also used to analyze the nature of the illuminating signal with respect to its carrier frequency, pulse width and other characteristics. The major deficiency in instantaneous frequency measurement receivers is that the receiver can only read out one input signal at a time.

If multiple signals arrive at the input of an instantaneous frequency measurement receiver, the best result possible is that the receiver reports only one of the input frequencies correctly and the receiver may even report an erroneous frequency that is not related to either one of the input signals—all without the operator being alerted to a difficulty. This and other characteristics of an instantaneous frequency measurement receiver may be better understood from a consideration of my U.S. Pat. No. 5,499,391 which is concerned with a digitized arrangement of an instantaneous frequency measurement receiver; the contents of which are hereby incorporated by reference herein. Various improvements have been suggested to detect and announce the existence of simultaneous signal difficulties in such a receiver, including assigning a single binary bit to values in the input data sequence as disclosed in one of my previous patent filings. However, these previous improvements have achieved only limited degrees of success, being unable to characterize two signals or being so hardware intensive and impractical that, after a period of frustration have, therefore, provided an incentive for the present approach to realization of a hardware efficient broadband electronic warfare receiver.

The role of an improved electronic warfare radio receiver in the present environment is, therefore, to provide an operator with information indicating that a search signal, a signal originating from, for example, a hostile radar apparatus, has found or at least been received at the operator's location. This search signal may be as brief in its time duration as a single pulse of radio frequency carrier signal—as indeed is in accordance with the practice used in modern stealth-considered radar equipment. From this brief received signal, it is nevertheless desirable to determine as much information as possible about the signal's originating radar apparatus, especially such information as the carrier frequency and the pulse characteristics of the radar.

The presence of two signal sources of close time concurrence and different frequency content is readily accommodated in the new type of radio receiver disclosed in the present document. This receiver is based on real time application of the discrete Fourier Transform mathematical function with a single binary bit kernel function. The Fourier transform concepts used in the present invention receiver are novel in that the mathematical operations performed to accomplish the Fourier transform are addition and subtraction, the requirement for multiplication operations in performing the Fourier transform has been eliminated. Not only is the receiver of the present invention able to process two signals simultaneously, it is simple and has the potential to be fabricated on a single chip.

The receiver of the present invention is perceived to fulfill a need in this field for a more reliable and foolproof apparatus for detection of and characteristic identification of incoming signals, an apparatus which performs in a reliable and predictable manner in the presence of one or two incoming radio frequency signals and is suitable for in the field usage. The present invention departs from the phase operated concepts of the IFM receiver and is believed to provide greater reliability and other advantages while also providing a receiver of relatively small physical size and overall simplicity.

The U.S. patent art indicates the presence of significant inventive activity in the area of broad spectrum radio receivers and in radio receivers and other apparatus which employ a Fourier transform function in order to examine frequency-related aspects of incoming signals. The present invention is, however, believed distinguished over the several inventions of this prior art by its specific treatment of the Fourier transform function and by the large demands placed on this Fourier transform realization in the real-time environment of a microwave band electronic warfare receiver.

SUMMARY OF THE INVENTION

The present invention provides a relatively small and simplified version of a digital broad spectrum radio receiver, a receiver having a simplified real-time Fourier transform realization and reception capability for at least two simultaneous signals and capable of implementation on a single chip.

It is an object of the present invention to provide a broad spectrum radio receiver having the capability to be manufactured on a single chip.

It is another object of the present invention to provide a broad spectrum radio receiver having multiple signal input capability.

It is another object of the present invention to provide a broad spectrum radio receiver suitable for aircraft or in the field use.

It is another object of the present invention to provide a broad spectrum radio receiver in which a real-time high frequency realization of a Fourier transform operation is achieved.

It is another object of the present invention to provide a broad spectrum radio receiver in which a complex Fourier transform related mathematical multiplication is accomplished in a simplified and easily realizable manner.

It is another object of the present invention to provide a broad spectrum radio receiver in which highly complex nonlinear signal processing, processing incapable of mathematical analysis, is accomplished.

Additional objects and features of the invention will be understood from the following description and claims and the accompanying drawings.

These and other objects of the invention are achieved by the method of characterizing one or two substantially coincident pulse-modulated electronic warfare radio frequency receiver signals, said method comprising the steps of:

converting said radio frequency receiver signals from an incident analog format to a digital format of single binary bit amplitude coding;

generating a discrete Fourier transform representation of said single binary bit amplitude-coded radio frequency receiver signals, said generated Fourier transform representation including a plurality of Fourier transform coefficient signal outputs each of known Fourier frequency association and of magnitude determined by waveform characteristics of said radio frequency receiver signals;

determining by amplitude comparison of said Fourier transform coefficient signal outputs which of said Fourier transform coefficient signal outputs have sufficient signal amplitude to represent a true identifying characteristic frequency of said received radio frequency signals.

DETAILED DESCRIPTION

Conventional wisdom in the electrical arts suggests the implementation of a Fourier transform function with electronic components necessarily includes the mechanization of complex mathematical multiplications. It is an accepted concept that simplification of the complex number multiplications, and in turn a reduction in required electronic components, called for in generating a Fourier transform results in the introduction of undesirable spurious or false Fourier transform output components.

According to this conventional wisdom, it is difficult to mechanize a Fourier transform-inclusive mathematical algorithm in apparatus which operates in real time at higher radio frequencies because of such multiplications. As a result, off-line processing is required in most signal processing instances which involve a Fourier transform or related mathematical operations performed on input data that is of any appreciable radio frequency spectral bandwidth. Under these conditions, the processing of the present invention, for example, wherein signals of gigahertz radio frequency carrier and one-tenth microsecond to continuous wave modulation rate are encountered, i.e., signals used in radar and electronic warfare systems, would clearly be relegated to the realm of off-line processing in a cumbersome, energy consuming, electronic component burdened architecture if the arrangement of the present invention were not available.

The above described limitations of presently available electronic warfare radio receivers call for a different approach to configuring receivers used for these purposes. This different approach could well be based on the frequency component identification capability of a Fourier transform if such a transform (with its large number of mathematical multiplications and summations) could be practically implemented in electronic hardware form on a single integrated circuit chip to operate in real time at the radio frequency carrier and pulse modulation rates encountered in such receivers. Even though the prior art identified in connection with the present patent document indicates a number of inventors have implemented a Fourier transform function using a reduced number of computational steps and faster throughput rates, it is believed that none of these efforts have approached the processing rates, operating bandwidth with the capability for implementation on a single integrated circuit chip needed in a present-day electronic warfare receiver.

Figure 1:
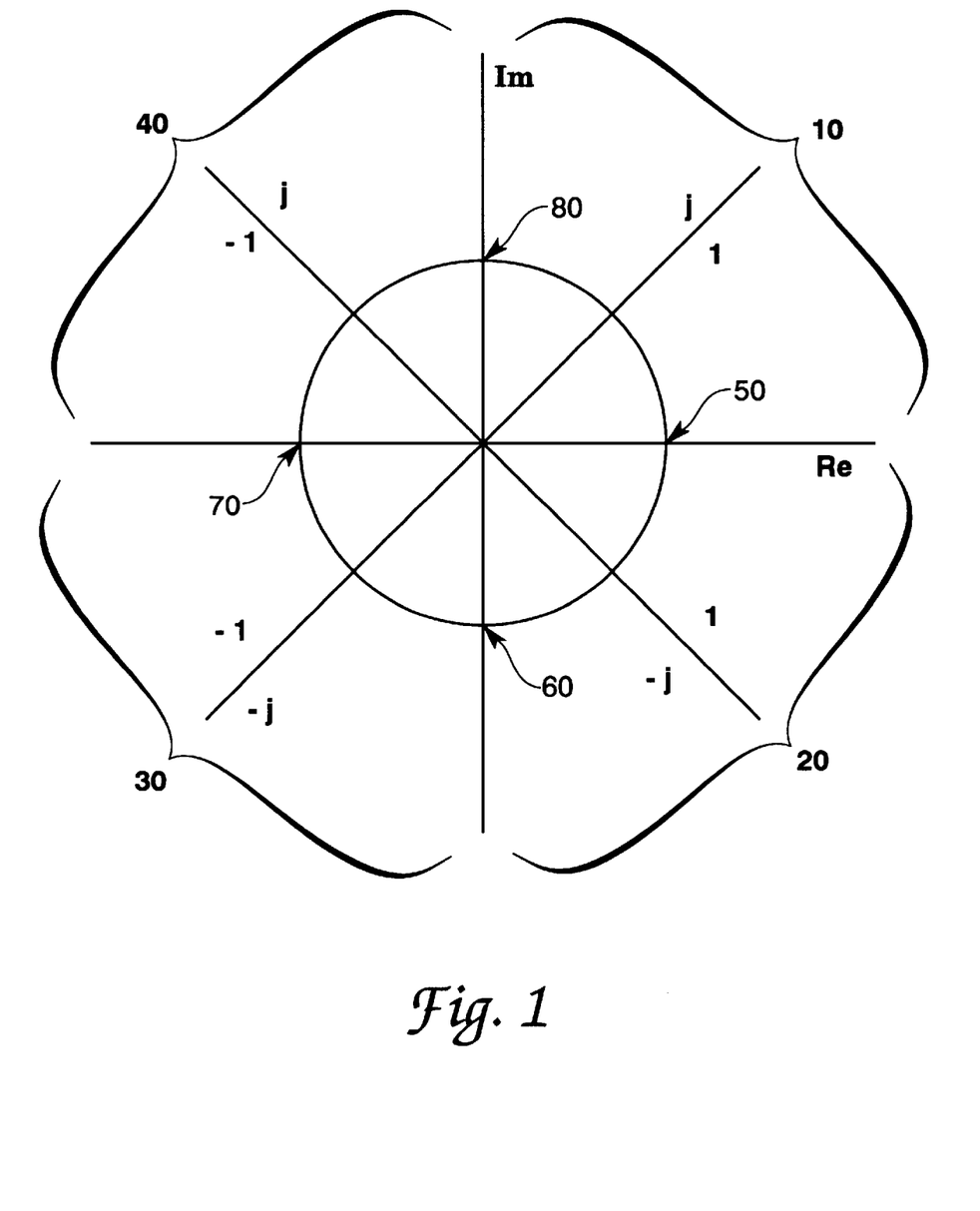
FIG. 1 shows a graph illustrating the four quanitized values of the kernel function in accordance with the present invention.

The receiver of the present invention is based on the use of a single-bit digital representation of the kernel function. This single bit kernel function is used in the present invention as one term, the $$e^{\frac{-j2\pi nk}{N}}$$

term, in the well-known Fourier series transform mathematical expression of:

$$X(k) = \sum_{n=0}^{N-1} x(n) e^{\frac{-j2\pi nk}{N}} \qquad \text{Eq. 1}$$

where x(n) are input data points and N is the total number of data points. FIG. 1 is a graphical representation of the kernel function of Eq. 1. To simplify, the kernel function is quanitized into four different values 1, -j, -1, and j on the unit circle on the x and y axis as shown at 50, 60, 70 and 80, respectively, in FIG. 1. The kernel function may be quanitized into values other than on the x and y axis on the unit circle, in the quadrants 10, 20, 30 and 40, for example; however, such digitization produces much more complicated calculations. Digitizing the kernel function to either 1, -j, -1 and j may require as few as 4000 adders per chip while quanitizing to a value on the unit circle, off the x and y axis and within one of the quadrants may requires as many as double or triple that amount, depending on the application. The kernel function is therefore represented by either +1, -1 or +j, -j values in view of the one-bit digitization or analog-to-digital conversion used; thus, there is no multiplication required in implementing the equation. The remaining operations required in the receiver of the present invention to perform the Fourier transformation are summations, operations which can be accomplished very quickly. Although Eq. 1 can be implemented in many different ways, the most challenging tasks of implementing the present invention are to reduce the number of hardware components so as to make the receiver practical and capable of implementation on a single integrated circuit chip. A reduction of the kernel function in this expression is, therefore, a major convenience and a major computation complexity-saving approximation in the present invention.

Prior work attempted to simplify processing of the Fourier transformation by assigning the input data x(n) of Eq 1 a single binary bit value. However, under this approach the performance of the receiver was inferior. Further, the kernel function still remained as part of the Fourier transform equation and was difficult to implement into hardware when not assigned a single binary bit value. Accordingly, the receiver was more complicated and hardware intensive.

Figure 2:
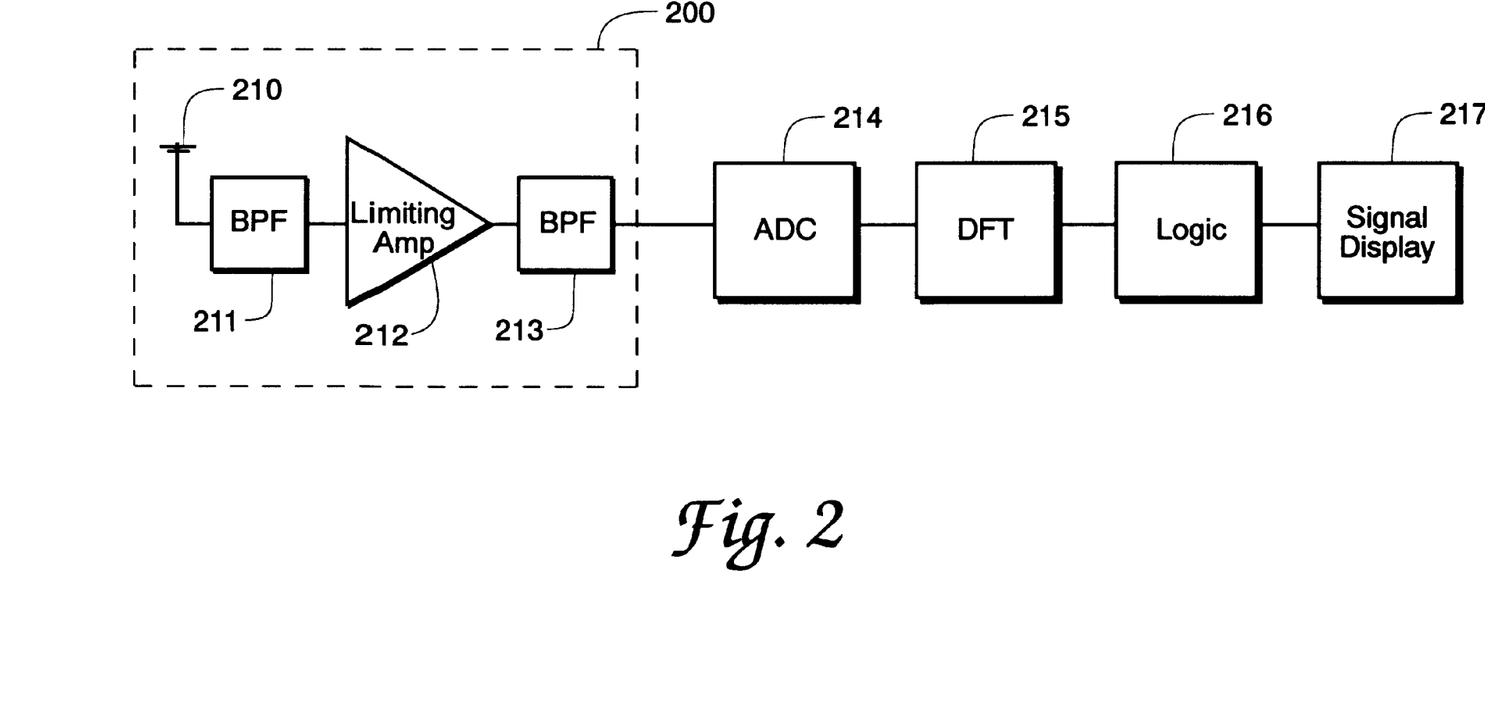
FIG. 2 shows a functional block diagram of apparatus which may be used to embody the present invention.

FIG. 2 in the drawings shows the five major components of a digital one bit broadband radio receiver according to the present invention, a receiver suitable for use in electronic warfare environments which possibly involve the reception of two coincident incoming radio frequency signals. In the FIG. 2 drawing, a radio frequency front end 200 contains an antenna 210 or some other radio frequency energy source which provides electrical input signals of a broadband spectrum to a series of signal processing circuits which include a filter element 211, a limiting amplifier 212, and a second filter element 213. Following the front end 200 is an analog-to-digital converter 214, a discrete Fourier transform generating circuit 215, a threshold and decision logic array 216 and a signal display 217. The radio receiver of FIG. 2 is, for example, intended for use in the one to two gigahertz band of radio frequencies and is intended to provide a reception bandwidth inclusive of, for example, a one gigahertz spectrum spread in this band.

In the FIG. 2 diagram, the radio frequency signals received from the antenna 200 or other signal source are first passed through the bandpass filter 211 in order to attenuate signals outside the band of interest from subsequent processing in the receiver—signals such as may arise, for example, from a nearby radio frequency energy source of different frequency but relatively large signal strength. A limiting amplifier 212 is used to obtain signals of uniform amplitude from the output of filter 211 and an additional bandpass filter 213 is used to remove undesired frequency components inherently introduced by the action of this limiting amplifier and the generated noise. The bandpass filter 213 is provided with a passband corresponding with the receiver's input frequency and reception bandwidth. The analog-to-digital conversion of pulse modulated radio frequency carrier signals is accomplished in the analog-to-digital converter 214 in FIG. 2. Because the signal from the limiting amplifier has a constant amplitude, a two-bit analog-to-digital converter is satisfactory. A two-bit analog-to-digital converter is preferable over a one-bit analog-to-digital converter and a 3 or more bit analog-to-digital converter provides little improvement over a two-bit analog-to-digital converter as used in the present invention. In order to cover a 1 Gigahertz bandwidth, the analog-to-digital converter should operate at about 2.5 Gigahertz. The input frequency response of the analog-to-digital converter must be high enough to accommodate the input bandwidth of the receiver.

The Fourier transform generating circuit 215 is the key component of the receiver of the present invention. The Fourier transform generating circuit 215 is based upon Eq. 1 which comprises the summation of functions, the input and the kernel function. Designating the kernel function as a single binary-bit value eliminates the need for any multiplications in generating the Fourier transformation, only adders are required which greatly reduces the hardware requirements of the circuit and makes it possible for the receiver to be implemented on a single integrated circuit chip. There are two ways to further reduce the hardware requirements of the circuit, or chip. The first is to minimize the number of adders generating the fast Fourier transformation, and the second is to minimize the number of bits of each adder.

The purpose of reducing the number of adders in the hardware design is to produce the simplest Fourier transform integrated circuit chip possible. The idea of minimizing adders needed in generating a fast Fourier transform will be illustrated hereafter by considering a 256-point Fourier transform. For a standard Fourier transform operation, there are eight layers of adders and multipliers; eight layers of adders are also needed in the illustration of the present invention. The number of layers is determined by the equation $N\ln_2 N$ with N being the number of input data points of the Fourier transformation. Accordingly, in the illustration of the present invention, N=256 and $2^8$=256, so there will be eight layers of adders in the chip.

In general, the inputs to the adders are complex numbers and they can be represented by a+jb, where $j=\sqrt{-1}$ and a, b are the input data. The four values (+1, −1, +j, −j) of the kernel function operated on the input will produce the following results:

$$1*(a+jb)=a+jb$$

$$-1*(a+jb)=-a-jb$$

$$j*(a+jb)=-b+ja$$

$$-j*(a+jb)=b-ja$$

It is apparent that in the above operations no multiplication is required. Only the sign and the real and imaginary of the two bit inputs need be traced. However, the input data collected from the analog-to-digital converter are real instead of complex. Some of the outputs from the adders may remain real or imaginary instead of complex. Under these conditions one adder instead of two adders is enough. The final outputs contain 256 complex outputs, but only half of the outputs contain information; the information from the other half outputs is redundant, so only 128 complex may be needed.

The second step in simplifying a chip used for generating a fast Fourier transformation for the electronic warfare receiver of the present invention is to minimize the number of bits of all adders. The input data has two bits. As is known, adding two input data points of two bits each will result in a data point comprising three bits. Accordingly, a three-bit adder is required. As stated previously, a minimum of eight layers of adders are required, and using the same reasoning, the number of bits of the adders in the first layer is three bits, the number of bits of the adders in the second layer is four bits, the number of bits of the adders in the third layer is five bits, the number of bits of the adders contained in the fourth layer is six bits, the number of bits of the adders contained in the fifth layer is seven bits, the number of bits in adders in the sixth layer is eight bits, the number of bits of adders in the seventh layer is nine bits and the number of bits contained in adders of the eight layer is ten bits. As the number of bits of an adder increase, the less desirable the adder becomes because it consumes more energy—it is less efficient. However, in the electronic warfare receiver of the present invention, a maximum of two signals, or two frequencies, will be processed at any given time, hence all ten bits are not required to make a decision. The number of bits required by each adder is related to the performance of the receiver, or the ability of the electronic warfare receiver logic to tolerate false frequency generations. Simulated results show that a minimum of seven bits produces satisfactory results. Seven-bit adders are used in layers four through eight, making the number of bits of the adders of the eight layers three, four, five, six, seven, seven, seven, and seven, respectively. The final four adders each have seven bits because in the illustrated arrangement, the least significant bit is neglected. Neglecting the least significant bit produces error in the layer immediately following. However, simulated results show that in the illustrated arrangement such error does not effect the performance of the receiver significantly and the additional simplicity accorded the chip outweighs the error produced.

Figure 3:
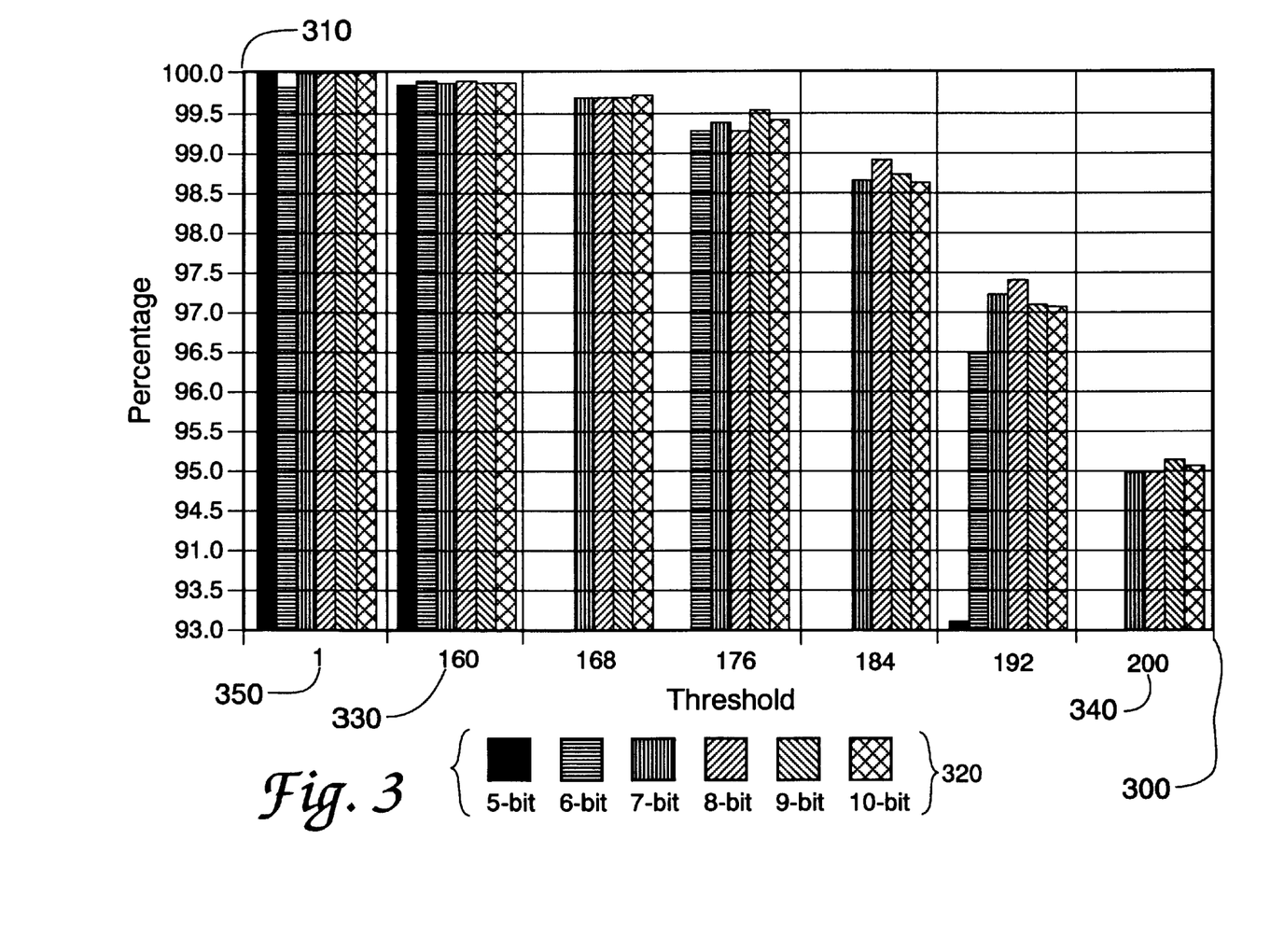
FIG. 3 shows a graph illustrating probability of detection of a first signal.
Figure 4:
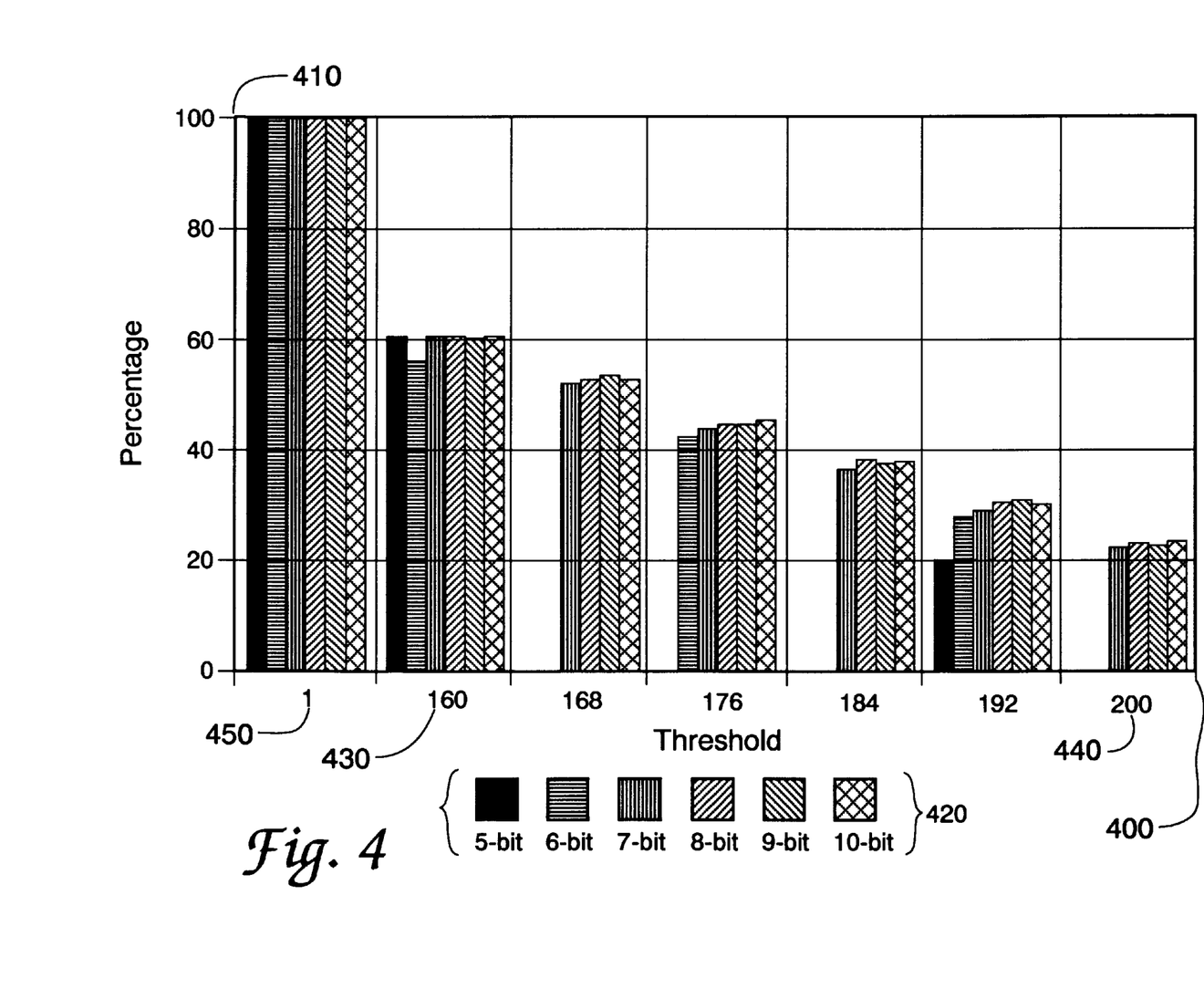
FIG. 4 shows a graph illustrating probability of detection of a second signal.
Figure 5:
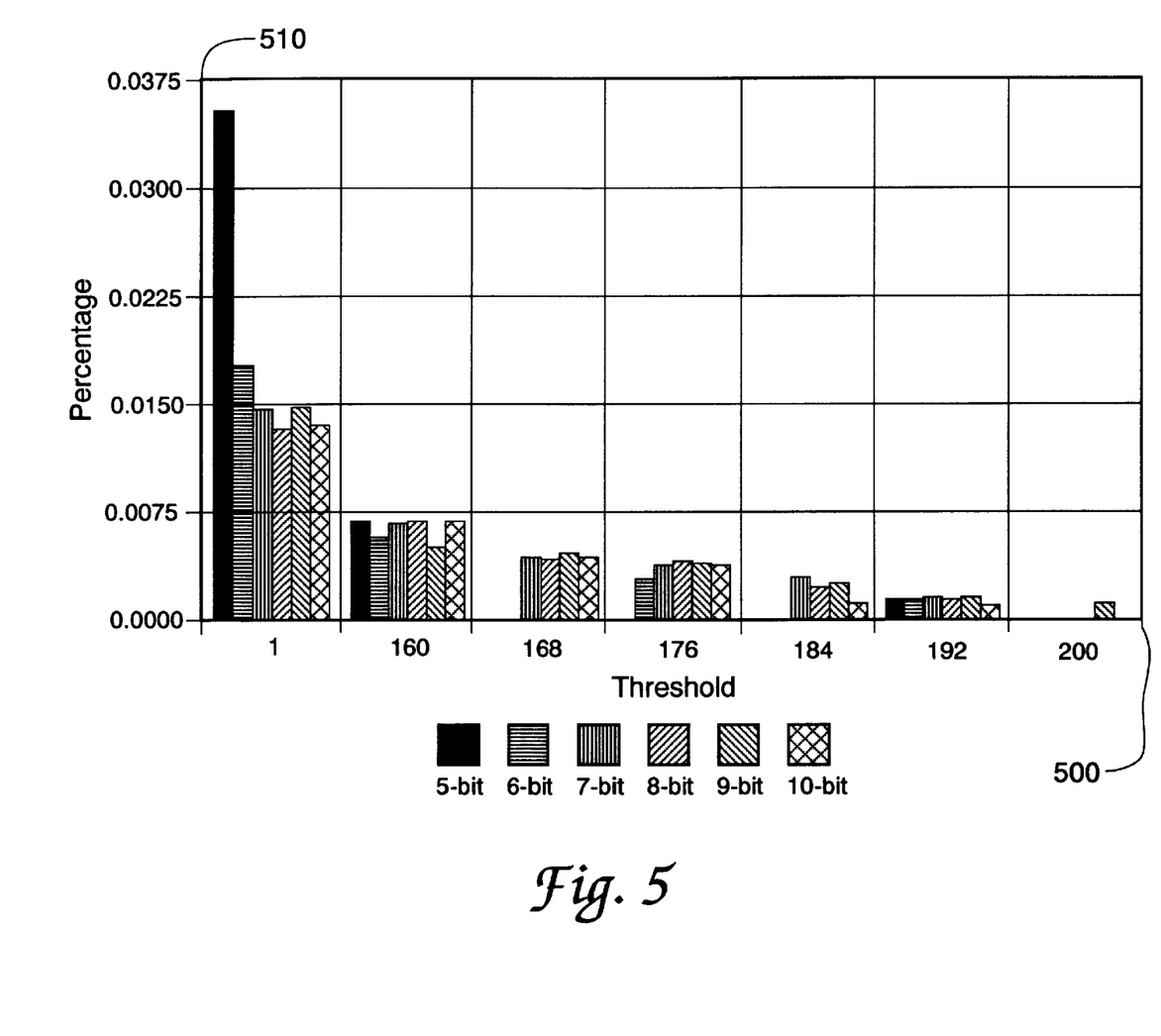
FIG. 5 shows a graph illustrating the probability of producing erroneous frequency information.

Simulations performed supporting the reduction of bits in the adders is included in FIGS. 3 and 4 which are graphs illustrating the receiver function of locating the two largest Fourier coefficients—i.e., the probability of detecting a first signal and second signal, respectively, dependent upon the number of bits in the adders. FIG. 5 is a graph illustrating the probability that the second signal produces erroneous frequency information. The x-axis of the graphs, shown at 300 in FIG. 3, 400 in FIG. 4 and 500 in FIG. 5, represents a threshold value, a binary dimensionless value selected relative to input data to test the logic capability of the receiver for two simultaneous signals. The y-axis of the graphs of FIGS. 3, 4 and 5 shown at 310, 410 and 510, respectively represent percentage or probability of detection of the signal by the electronic warfare receiver of the present invention. The bars within the graph each represent the probability of detection using a minimum number of bits in the adders performing the Fourier transformation, with the number of bits represented by each bar indicated in the key at 320, 420 and 520 in FIGS. 3, 4 and 5, respectively. For example, in the graph of FIG. 3, the probability that the electronic warfare receiver of the present invention will detect the first signal at a threshold of one, shown at 350 in FIG. 3 is 100% regardless of the minimum number of bits in the adders. Similarly, in the graph of FIG. 4, the probability that the electronic warfare receiver of the present invention will detect the first signal at a threshold of one shown at 450 in the drawing is 100% regardless of the minimum number of bits in the adders. In FIG. 3, the bars at the remaining thresholds 160 indicated at 330 in the drawing and threshold 200 indicated at 340 in the drawing show that the probability of detecting the first signal is approximately the same percentage regardless of the number of bits in the adders. Similarly, in FIG. 4, the second signal being of a lesser magnitude than the first signal of FIG. 3, also is detected by the electronic warfare receiver of the present invention with the number of increasing adder bits being inconsequential. FIGS. 3 and 4 support the premise of reducing the number of bits in the adders used to perform the arithmetic calculations that generate the fast Fourier transformation, thereby reducing the complexity of an integrated circuit chip implementing such Fourier transform. Finally, FIG. 5 indicates the probability of producing erroneous frequency information relative to the second signal and further indicates that the probability is not largely dependent on the number of bits in the adders.

The output of the Fourier transform generating circuit of 215 of FIG. 2 includes a plurality of signals each representing the magnitude of a Fourier series term coefficient, i.e., representing the amplitude of one component signal of selected Fourier frequency, which appears in the output signal. The task of the threshold and decision logic circuit at 216 in the FIG. 2 drawing is, of course, to in some way select the signals representing true Fourier transform components present in the Fourier transform generating circuit 215 output signals and reject the spurious signal components. In the presence of significant amplitude differences this separation can be accomplished on the basis of signal amplitude. A fixed decision threshold may be employed to accomplish this decision. In the instance of other input signals of differing relative signal strengths, lower quality or greater noise content for example, it may be desirable to generate an intelligent or active decision threshold which is based on some average of input signal amplitudes or otherwise identifies only the one or two greatest amplitude peaks.

Figure 6:
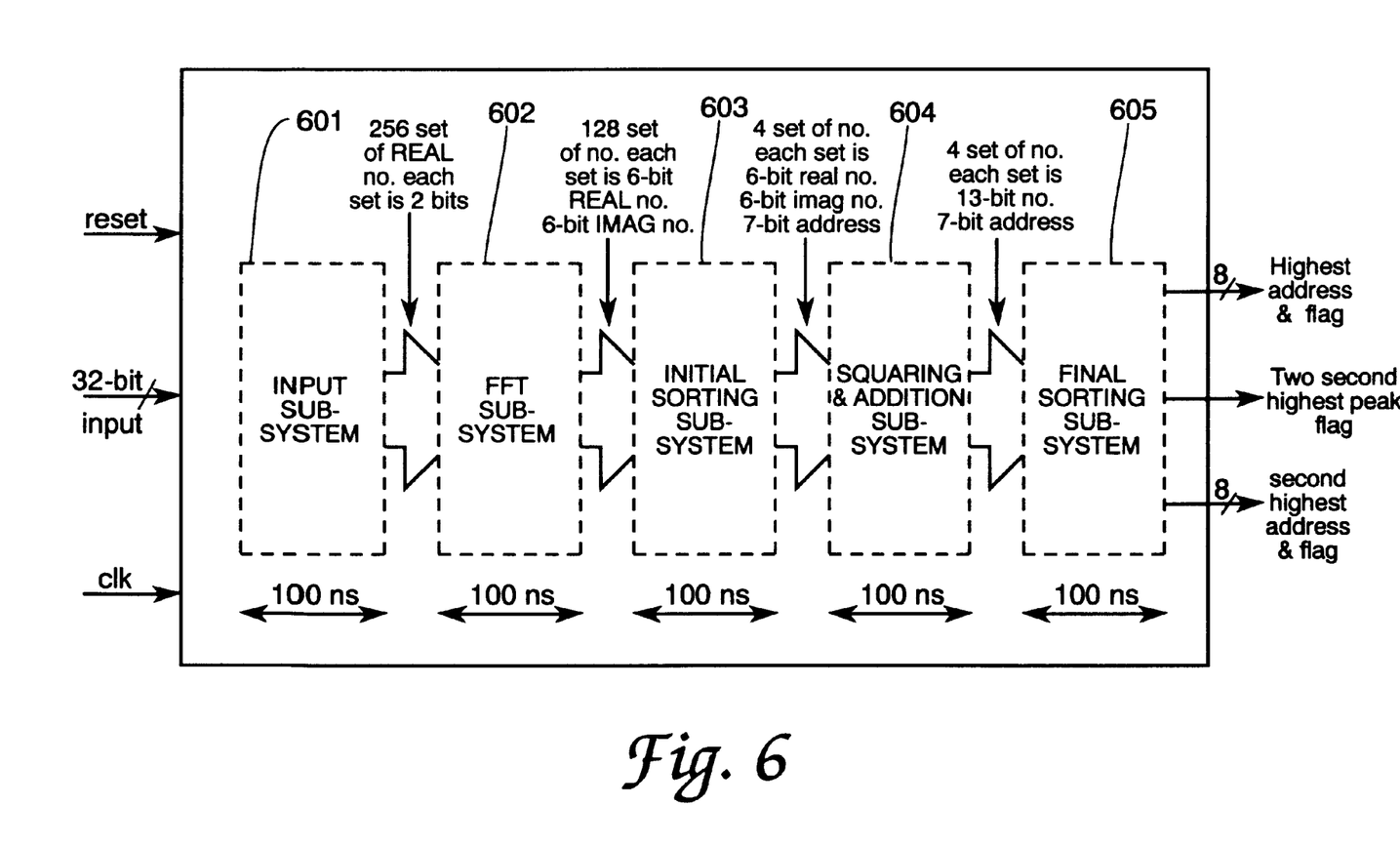
FIG. 6 shows a functional block diagram of a chip arrangement which may be used to embody the present invention.

FIG. 6 shows a block diagram arrangement that may be employed for an integrated circuit chip performing the functions of the monobit kernel function receiver illustrated in FIG. 2. For illustration purposes, 256 input data values or sets are employed to illustrate the FIG. 6 arrangement of the receiver of the present invention. The receiver consists of three major elements: a nonlinear radio frequency front end, a signal sampler and formatting system (analog-to-digital converter and demultiplexers), discussed previously, and an application specific integrated circuit using a monobit algorithm for signal detection and frequency measurement. The application specific integrated circuit has two specific functions: to perform a fast Fourier transform and determine the two signals with the largest Fourier coefficients and report their frequencies. The 256 sets of inputs are loaded into the receiver every 100 nanoseconds. In order to maintain this speed, the whole chip is broken down into five different subsystems pipelined together. The process within each subsystem is completed within 100 nanoseconds with the results conveyed to the following subsystem. The subsystems include an input subsystem at 601, a fast Fourier transform subsystem at 602, an initial sorting subsystem at 603, a squaring and addition subsystem at 604 and a final sorting subsystem at 605. The application specific integrated circuit will process the analog-to-digital outputs in real time, producing detected signal reports preferably every 100 nanoseconds.

Figure 7:
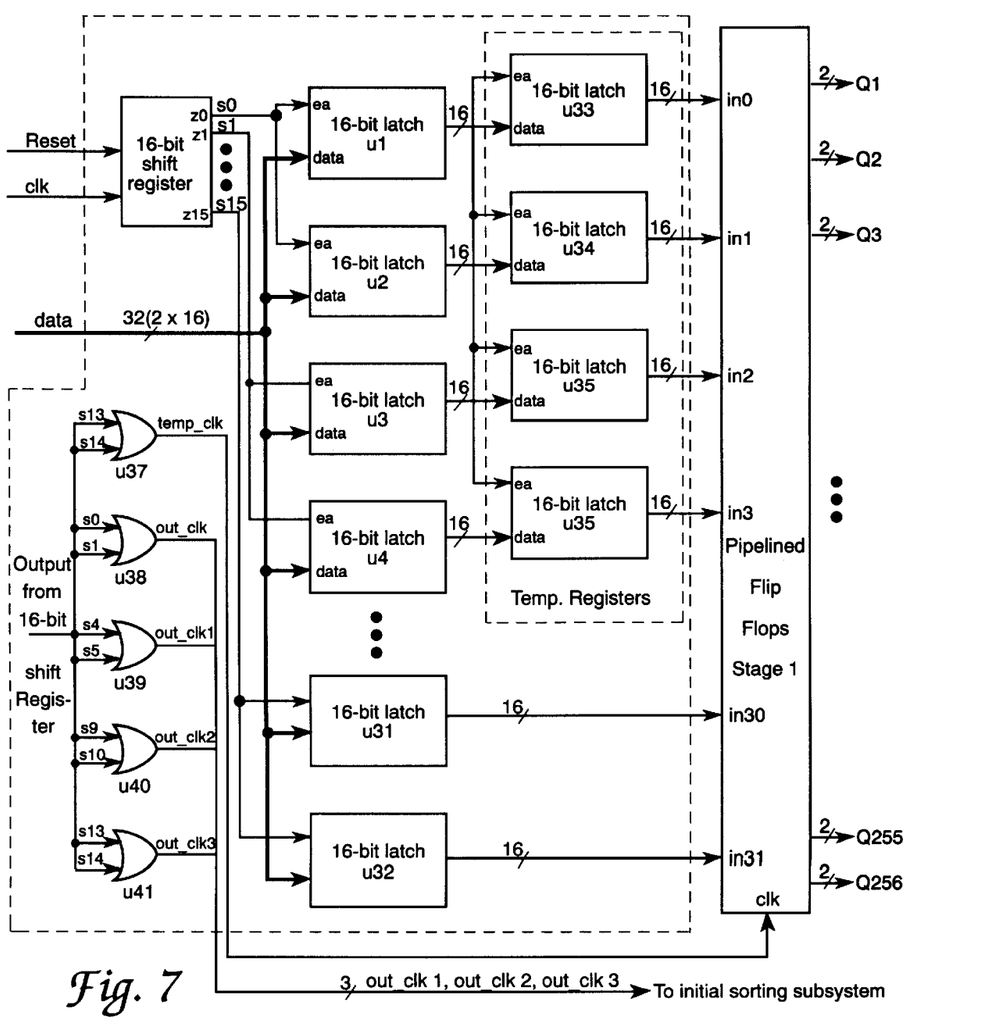
FIG. 7 shows a functional block diagram of apparatus which may be used to embody the input subsystem.

FIG. 7 is a block diagram of a possible implementation of the input subsystem at 601 in FIG. 6. The main function of the input subsystem is to receive 32 bits of parallel input data that flow in consecutively, store the data and finally produce 256 sets of real numbers for the fast Fourier transform subsystem.

Figure 8:
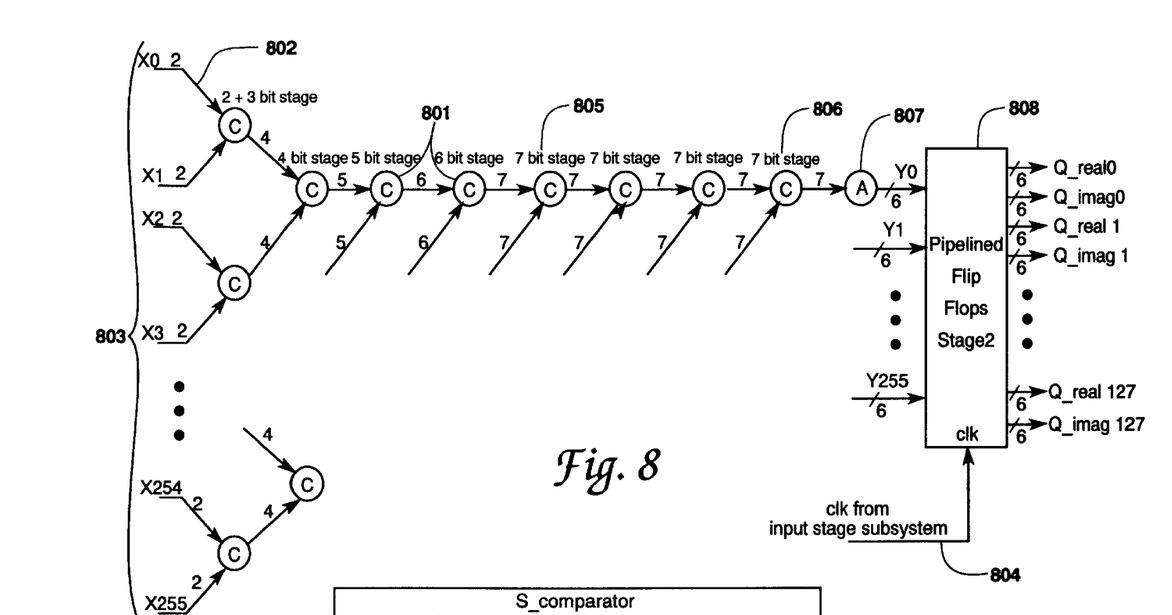
FIG. 8 shows a functional block diagram of apparatus which may be used to embody the fast Fourier transform subsystem.

FIG. 8 illustrates the fast Fourier transform subsystem, shown at 602 in the block diagram of FIG. 6. The main function of the fast Fourier transform subsystem is to perform the fast Fourier transform of Eq. 1 on the N, or 256, sets of input data. The result of the transform in the illustration of the present arrangement is 128 sets of output data. With 256 sets of input data, there are nine levels of transformation to lo be performed in this subsystem. Each level of transformation comprises approximately 256 arithmetic operations. All of the "C" or adder operations, two of which are indicated at 801, are limited to the arithmetic operations of addition or subtraction of two numbers. This limitation is based on the use of a single-bit digital representation of the kernel function of Eq. 1. The "C" operation may also be a bypass, a complement or no operation depending on the value of the input data. No multiplication is performed in any of the levels because the kernel function of Eq. 1 is a single bit. The inputs to the fast Fourier transform subsystem of FIG. 8 are 256 sets of data shown at 803 in FIG. 8 with each data set being 2-bits. The information is coded at the first level, the "2+3" bit stage shown at 802 in FIG. 8. The first level starts with a 2-bit operation and produces a 4-bit result. The first stage is followed by 4-bit, 5-bit and 6-bit operation stages at levels two, three and four, respectively. From level five at 805 until level eight at 806, all operations are seven bits, the minimum number of bits in the adders to generate the fast Fourier transform of Eq. 1 for the illustrated arrangement. Seven bits may be used by discarding the least significant bit of the sequence. The outputs from the fast Fourier transform subsystem are 128 sets of data. They are stored into flip flops in the pipelined flip flop stage 2 at 808 in FIG. 8. The outputs from the flip flop stage 2 are fed to the initial sorting subsystem stage shown at 804.

Figure 9:
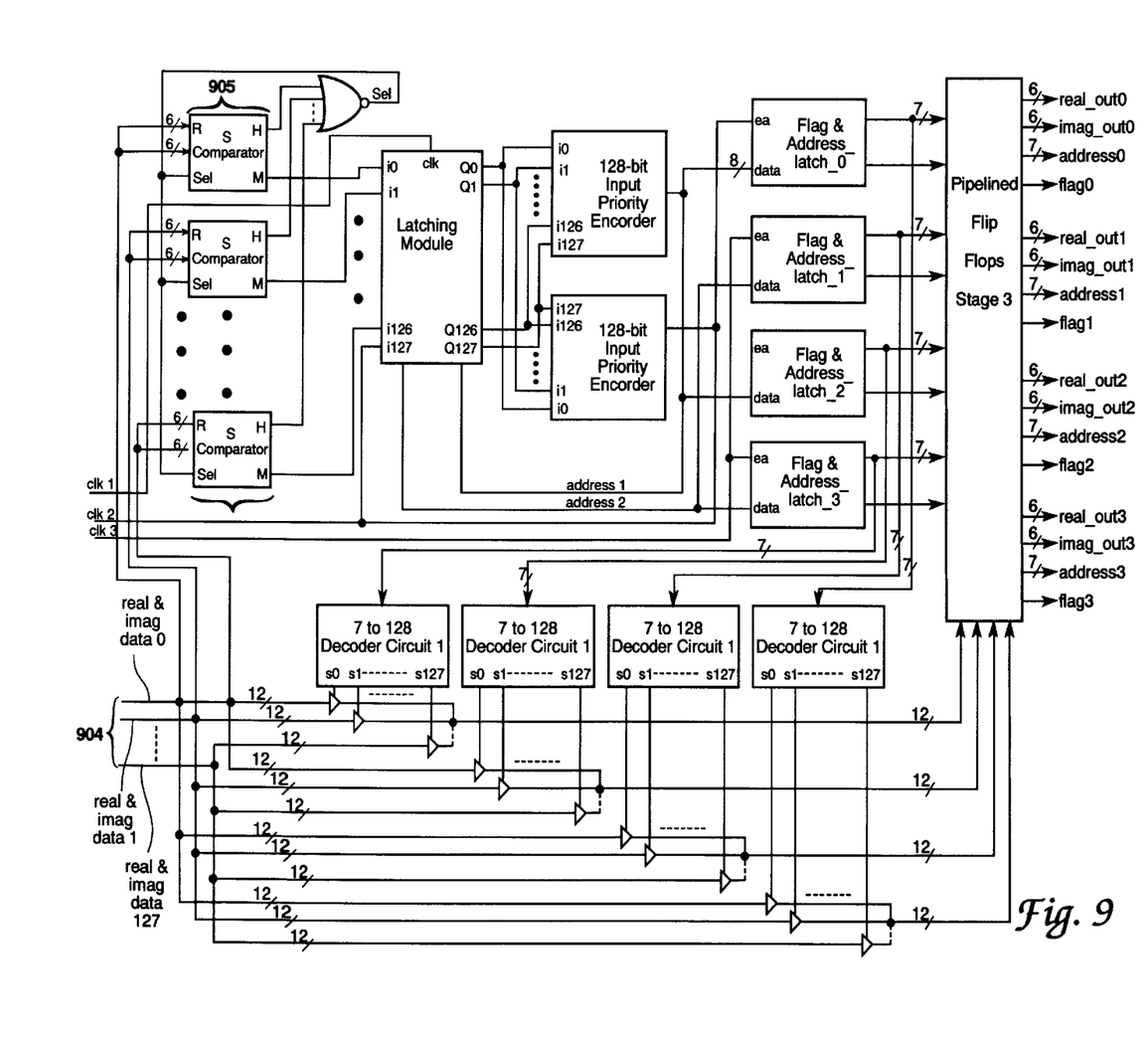
FIG. 9 shows a functional block diagram of apparatus which may be used to embody the initial sorting subsystem.

FIG. 9 is a functional block diagram for the initial sorting subsystem stage of a possible integrated circuit chip arrangement of the receiver of the present invention. The main function of the initial sorting subsystem is to locate the addresses of four signals from the 128 sets of output data of the fast Fourier transform subsystem that have the highest four Fourier coefficient amplitudes. The inputs to this subsystem are 128 sets of real and imaginary data at 904; data from the fast Fourier transform subsystem of FIG. 8.

Figure 10:
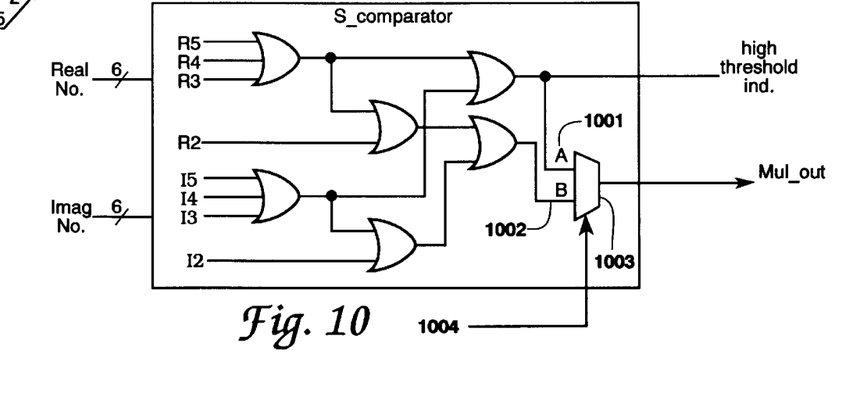
FIG. 10 shows a circuit diagram of a possible implementation of the S comparator.

The 128 sets of real and imaginary data are first fed to 128 S comparators shown at 905 in FIG. 9. A possible circuit diagram arrangement for an S comparator is shown in FIG. 10. In the S comparators the real and imaginary data are compared with two different threshold values; values which are set at eight and four in the illustrated arrangement. The results of the comparisons are fed to inputs A and B shown at 1001 and 1002 in FIG. 10. If any of the 128 sets of inputs to the S comparators exceeds the threshold value eight, the output will be the high level comparison result through the multiplexer 1003. However, if none of the 128 sets of inputs exceeds the threshold value 8, the output will be the low level comparison result through the multiplexer 1003.

Two different threshold levels, i.e., eight and four, are used due to the nonlinear effect of the radio frequency front end of the receiver. For example, if two signals are presented to the receiver, it is possible that neither one may cross the highest threshold. Accordingly, if there were no second, lower threshold, the receiver would miss signals. The search for four highest signals is completed within two cycles, there being a search for two signals per cycle.

Figure 11:
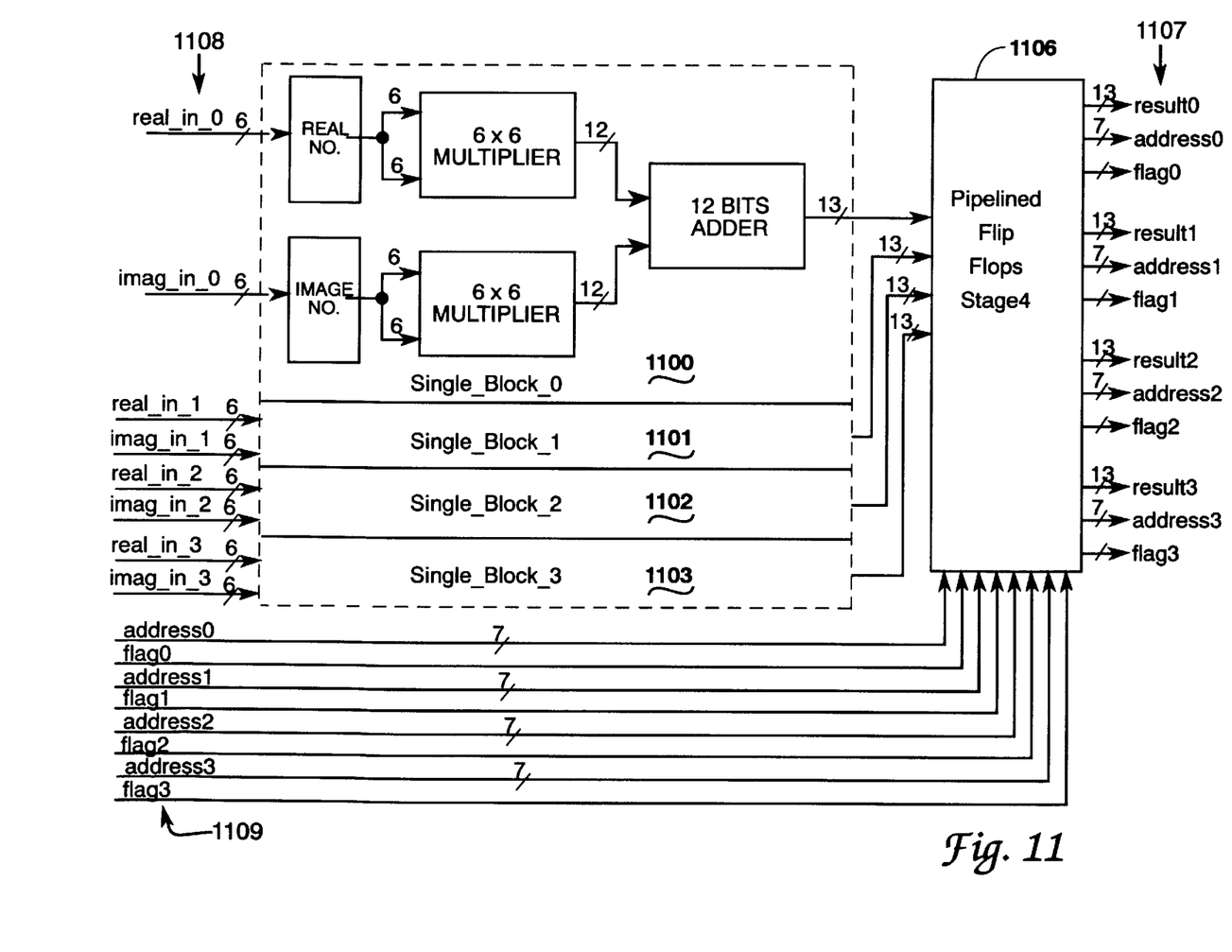
FIG. 11 shows a functional block diagram of apparatus which may be used to embody the squaring and addition subsystem.

FIG. 11 shows the squaring and addition subsystem of the integrated circuit chip arrangement of the receiver of the present invention. With the data obtained from the initial sorting subsystem received at 1108, the squaring and the arithmetic sum of such squared real and imaginary components is then computed. The squaring of each real and imaginary component is computed to obtain signal amplitude. The output of this subsystem are four sets of data at 1107; data which are input to the final sorting subsystem. FIG. 11 illustrates that the subsystem consists of four blocks of identical circuits at 1100, 1101, 1102 and 1103. The outputs from the flip flops at 1106 are then communicated to the final sorting subsystem.

Figure 12:
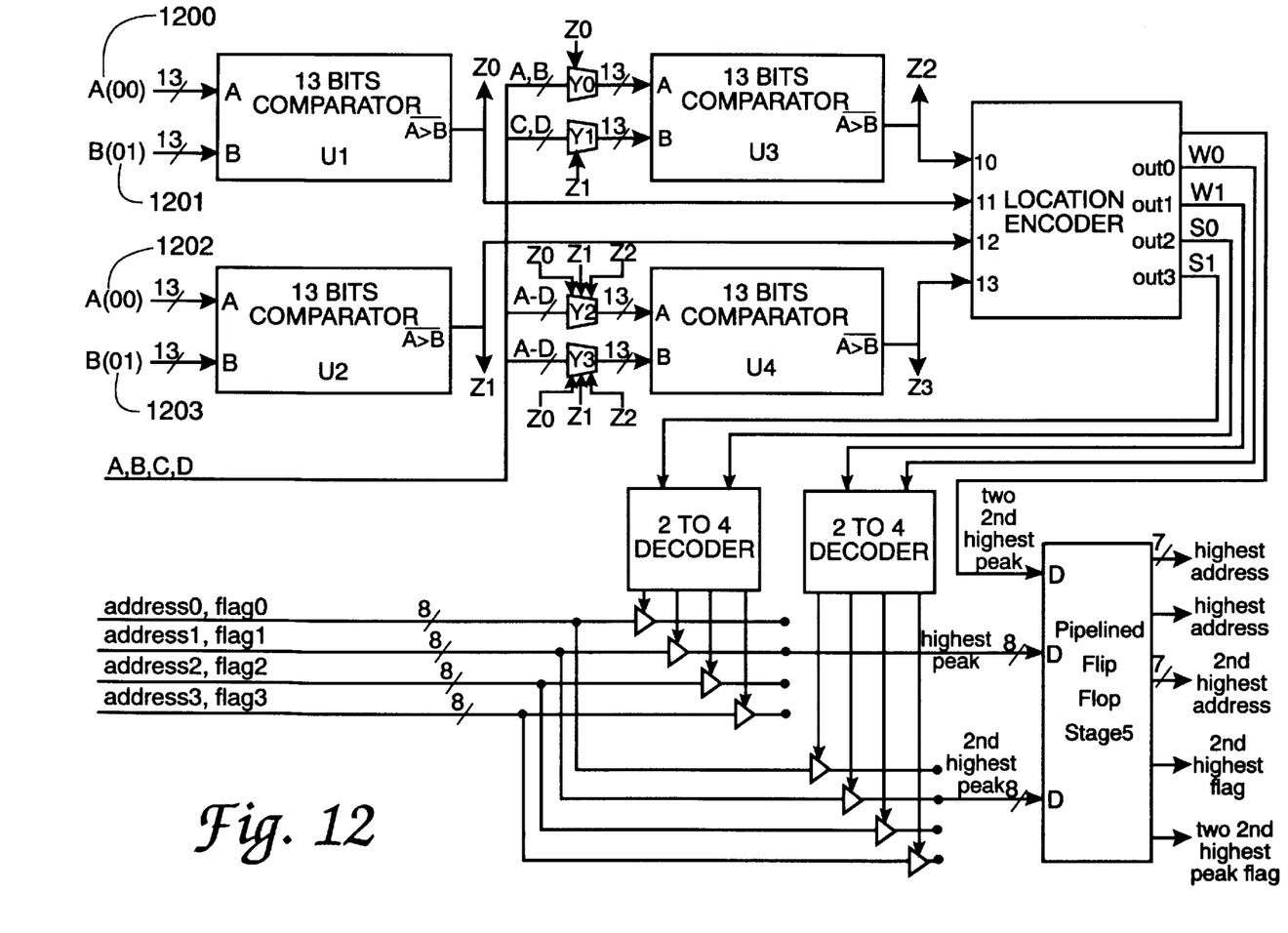
FIG. 12 shows a functional block diagram of apparatus which may be used to embody the final sorting subsystem.

FIG. 12 shows the final sorting subsystem for the integrated circuit arrangement for the receiver of the present invention. The function of the final sorting subsystem is to determine from its four sets of input data shown at 1200, 1201, 1202 and 1203, the addresses of the two signals with the highest amplitudes. If there is not any signal present, the output will be zeros. Likewise, if there is only one signal present, the output will indicate that there is not any second highest signal. Of the four signals that come into this FIG. 11 subsystem, should the amplitude of the second and third highest signals be equal, the "two second highest peak flag" signal 1214 will go high.

When a radio receiver of the present invention type is employed as an electronic warfare receiver, a desired function of the receiver is the presentation of data identifying the nature of received radio frequency signals in a comprehensible and easily digested form, a form which requires as little of an operator's time, reasoning-power and attention as is possible. It is, for example, desirable that any weighted or debatable decisions associated with the signals be accomplished by the receiver where both uniform and nonsubjective signal processing criteria can be invoked and a busy operator such as an aircraft pilot be thereby allowed to pursue other activities. Suitable formats for the output display of a receiver which accomplishes these desired functions may include, for example, an array of numeric values indicating frequency, signal strength, number of signals, modulation characteristics and perhaps direction of arrival or other signal identification information. The signal processing relating to several of these identifying characteristics is, of course, beyond the scope of the present invention; however, some form of output display as indicated at 217 in the FIG. 2 drawing is desired for those of these characteristics relating to the present invention.

The presently disclosed receiver will generally, therefore, not generate erroneous frequency information under specific simultaneous signal conditions. A receiver of the disclosed type will moreover produce correct frequency information for a one-signal input condition. If there are simultaneous signals received, the receiver reports the frequency of the strong signal—when the second signal is much weaker than the first signal. If the second signal is similar to the first signal in signal amplitude, the receiver will report both frequencies. Therefore, the disclosed receiver reports correct signal frequency information and under frequently encountered conditions, the receiver will report the signal frequency information relating to two simultaneous signals.

The herein disclosed radio receiver therefore provides a viable replacement for the often-used instantaneous frequency measurement radio receiver. The disclosed receiver provides better receiver capabilities and is significantly simpler and, therefore, provides improvements in cost, reliability and maintainability as well. The ability for implementation on a single integrated circuit chip in combination with the ability to process more than one concurrent input signal is a significant capability improvement of the receiver.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. The method of characterizing one or two substantially coincident pulse-modulated electronic warfare radio frequency receiver signals, said method comprising the steps of:

converting said radio frequency receiver signals from an incident analog format to a two-bit digital format;

generating a discrete Fourier transform representation of said amplitude-coded radio frequency receiver signals using a single binary bit kernel function, said generated Fourier transform representation including a plurality of Fourier transform coefficient signal outputs each of known Fourier frequency association and of magnitude determined by waveform characteristics of said radio frequency receiver signals; and determining by amplitude comparison of said Fourier transform coefficient signal outputs which of said Fourier transform coefficient signal outputs have sufficient signal amplitude to represent a true identifying characteristic frequency of said received radio frequency signals, said determining comprising one of the acts of selecting two of said Fourier transform coefficient signal outputs of selected threshold level-exceeding amplitude and selecting one of said Fourier transform coefficient signal outputs of selected threshold level-exceeding amplitude;

said substantially coincident pulse-modulated electronic warfare radio frequency receiver signals include modulation pulse waveforms of less than one-tenth microsecond temporal segregation at one of their leading and trailing pulse edges.

2. The method of characterizing one or two substantially coincident pulse-modulated electronic warfare radio frequency receiver signals of claim 1 wherein said step of determining by amplitude comparison of said Fourier transform coefficient signal outputs includes comparing amplitudes among said Fourier transform coefficient signal outputs.

3. The method of characterizing one or two substantially coincident pulse-modulated electronic warfare radio frequency receiver signals of claim 1 wherein said step of determining by amplitude comparison of said Fourier transform coefficient signal outputs includes comparing amplitudes of said Fourier transform coefficient signal outputs with a fixed threshold level of selected amplitude.

4. The method of characterizing one or two substantially coincident pulse-modulated electronic warfare radio frequency receiver signals of claim 1 wherein said step of determining by signal amplitude comparison includes the step of selecting a Fourier transform coefficient signal decision threshold level of sufficient amplitude to exclude as an identifying characteristic frequency of said received radio frequency signals, Fourier transform coefficient signal outputs resulting from said discrete Fourier transform representation of single binary bit amplitude-coding.

5. The method of characterizing one or two substantially coincident pulse-modulated electronic warfare radio frequency receiver signals of claim 1 further including the step of displaying to an operator a results of said step of determining by amplitude comparison of said Fourier transform coefficient signal outputs which of said Fourier transform coefficient signal outputs have sufficient signal amplitude to represent a true identifying characteristic frequency of said received radio frequency signals.

6. The method of characterizing one or two substantially coincident pulse-modulated electronic warfare radio frequency receiver signals of claim 1 wherein said step of converting radio frequency receiver signals from an incident analog format to a digital format of single binary bit amplitude coding includes generating a converted output signal having unitary amplitudes of positive and negative sign value, output signals capable of zero imaginary component-amplitude complex number mathematical multiplication.

7. An electronic warfare radio receiver apparatus comprising the combination of:

a two-bit analog-to-digital converter circuit connected to receive analog electrical input signals communicated to said receiver, said analog-to-digital converter circuit including real time digital output signal generation capability at data rate frequencies comprising said receiver analog electrical input signals;

a discrete Fourier transform generating electrical circuit connected to an output signal port of said two-bit analog-to-digital converter circuit, said Fourier transform generating electrical circuit having a kernel function assigned a single binary bit value of positive one and negative one unitary magnitude;

said Fourier transform generating electrical circuit generating a plurality of Fourier transform coefficient signal outputs using adding electrical circuit components;

digital decision logic circuitry connected to an output signal port of said discrete Fourier transform-generating electrical circuit, said decision logic circuitry including an analog-to-digital conversion threshold of selected magnitude;

operator communicating signal display apparatus connected with an output signal of said digital decision logic circuitry; and over the air signal communication antenna apparatus connected to receive and communicate to said electronic warfare radio receiver a wideband spectrum of radio frequency signals.

8. The real time broadband electronic warfare radio receiver apparatus of claim 7 wherein said discrete Fourier transform generating electrical circuit comprises an electrical embodiment of the mathematical equation:

$$X(k) = \sum_{n=0}^{N-1} x(n) e^{\frac{-j2\pi nk}{N}}$$

where x(n) are input data points, $$e^{\frac{-j2\pi nk}{N}}$$

is the kernel function and N is the total number of data points.

9. The real time broadband electronic warfare radio receiver apparatus of claim 7 wherein said coincident signals comprise pulse modulated radio frequency carrier signals of greater than one gigahertz carrier frequency and between one-tenth microsecond and continuous wave pulse modulation frequency.

10. The real time broadband electronic warfare radio receiver apparatus of claim 7 further including, prior to said discrete Fourier transform generating electrical circuit, a first bandpass electrical wave filter capable of de-emphasizing input radio frequency signals outside of an input bandwidth of said receiver, a signal amplitude-limiting amplifier connected to an output port of said first bandpass electrical wave filter and a second bandpass electrical wave filter connected to an output port of said signal amplitude-limiting amplifier and capable of excluding signals of spurious frequency generated in said signal amplitude-limiting amplifier from said discrete Fourier transform generating electrical circuit.

* * * * *